United States Patent [19]

Farouche et al.

[11] 4,304,385
[45] Dec. 8, 1981

[54] TILT, SWIVEL AND VERTICAL CONTROL MECHANISM FOR CRT TERMINAL

[75] Inventors: Philip N. Farouche, Frankfort; John H. Lanahan, Whitesboro, both of N.Y.

[73] Assignee: ICL, Inc., Utica, N.Y.

[21] Appl. No.: 113,001

[22] Filed: Jan. 17, 1980

[51] Int. Cl.³ .............................................. F16M 11/00
[52] U.S. Cl. ................................... 248/410; 248/416; 248/181; 248/183
[58] Field of Search ............... 248/185, 410, 415, 416, 248/183, 181, 418

[56] References Cited

U.S. PATENT DOCUMENTS

| 1,845,143 | 2/1932 | Friesner | 248/410 X |
| 2,442,779 | 6/1948 | Oriold | 248/410 |
| 2,496,232 | 1/1950 | Potter | 248/185 X |
| 2,556,206 | 6/1951 | Militano | 248/181 |
| 3,204,898 | 9/1965 | Manning | 248/181 X |
| 3,661,376 | 5/1972 | Hill et al. | 248/183 X |
| 3,724,798 | 4/1973 | Lucasey | 248/418 |
| 3,970,792 | 7/1976 | Benham et al. | 248/183 X |

*Primary Examiner*—Price C. Faw, Jr.
*Attorney, Agent, or Firm*—Sughrue, Mion, Zinn, Macpeak and Seas

[57] ABSTRACT

A tilt, swivel and vertical control mechanism is provided between a display device such as a CRT and a stable base. The control mechanism provides freedom of motion for the display device such that the device may be tilted, rotated and vertically displaced in order to accommodate user preferences. The control mechanism is further provided with a conduit having a display device cable running therethrough.

14 Claims, 8 Drawing Figures

TILT, SWIVEL AND VERTICAL CONTROL MECHANISM FOR CRT TERMINAL

FIELD OF THE INVENTION

The present invention relates to mechanisms for supporting electrical equipment such as display devices which require a relatively large number of electrical connections to and from external equipment.

BACKGROUND OF THE INVENTION

Cathode ray tube (CRT) displays and other display systems are generally designed for average user requirements. Specifically, parameters such as height, angle of inclination and pointing direction are designed for the average user. Problems obviously arise in the use of such generally designed display systems when the above mentioned parameters are not satisfactory for a particular user.

Although the provision of universal joint mechanisms and the like may solve the problems associated with angle of inclination and pointing direction, and while apparatus for adjusting the height of the display system may be provided to account for height preferences of individual users, the use of such techniques causes problems associated with CRT terminal connectors. That is, the CRT terminal connectors which have heretofore been connected directly from supporting equipment such as a computer to the CRT, will necessarily be subject to a large amount of motion between the CRT and supporting equipment as the display device is rotated, tilted and moved up and down. This relative motion causes a pulling and twisting action on the CRT terminal connectors and must be avoided.

SUMMARY OF THE INVENTION

It is an object of the present invention to provide a mechanical support system between the CRT display assembly and a fixed base assembly.

It is a further object of the invention to provide a mechanical support system between an adjustable display case assembly and the fixed base assembly, the support system providing (1) ±15° inclination with respect to the horizontal, (2) ±60° rotation about a vertical axis and (3) vertical adjustment of approximately two inches. The above-mentioned positioning of the display case assembly may be easily accomplished manually without the aid of special tools or equipment.

It is a further object of the present invention to provide a conduit or passageway arrangement throughout the tilt, swivel and vertical control mechanism so as to allow passage of the display terminal connector cable from a stationary base through the control mechanism to the display device so that the tilt, swivel and vertical adjustments can be made throughout the entire range of display device positions while at the same time reducing the amount of motion of the terminal connector cable between the supporting equipment and the display device.

DETAILED DESCRIPTION OF THE INVENTION

Figure 1:
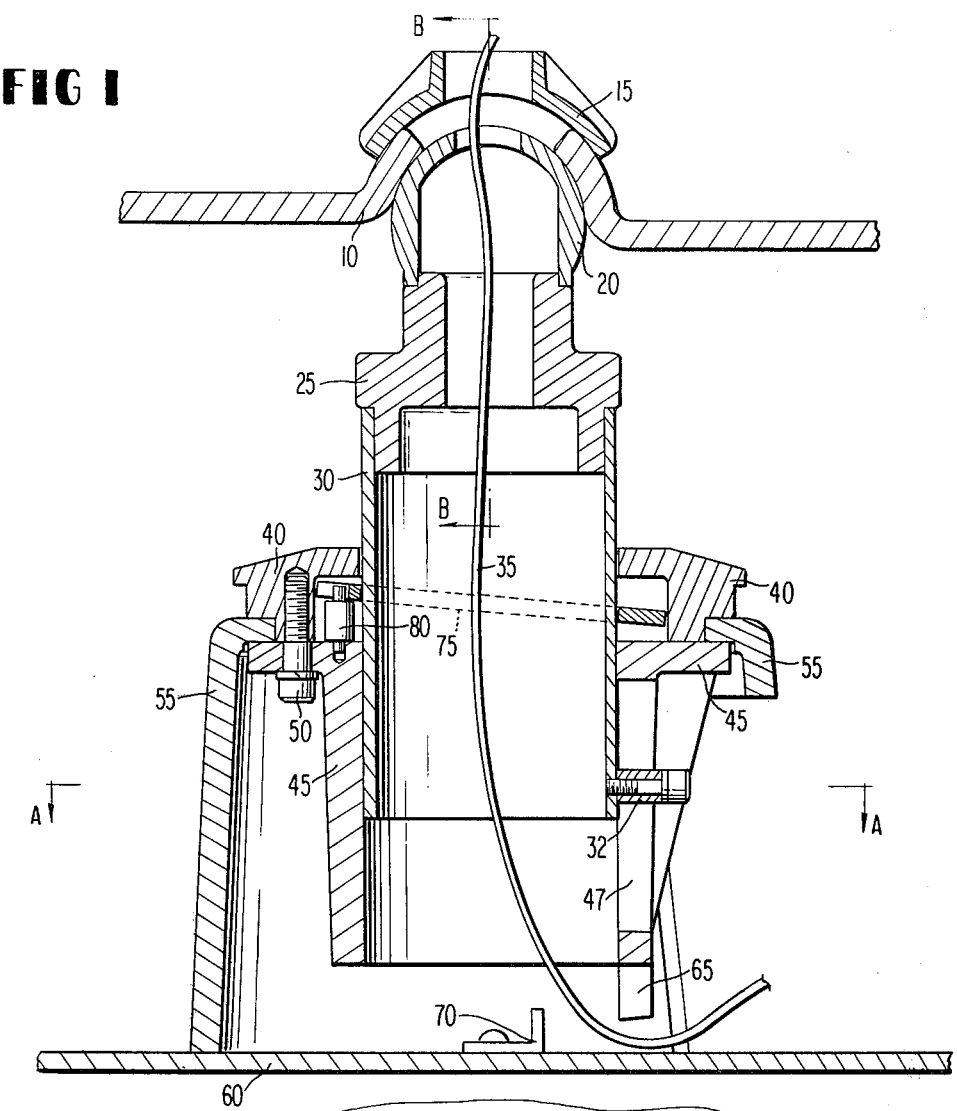
FIG. 1 illustrates a cross-sectional view taken through the midpoint of the CRT mounting structure.

The CRT tilt, swivel and vertical control mounting mechanism is best described with reference to FIGS. 1 through 4. Identical structures in FIGS. 1 through 4 are represented by like reference numerals. FIG. 1 illustrates a side cross-sectional view of the tilt, swivel and vertical control mechanism taken through the center of the mechanism. The CRT case 10 is mounted between tilt friction clamp 15 and a cylindrical tilt joint bearing 20. Tilt joint bearing 20 is fixedly attached to bearing support 25 which is in turn fixedly attached to vertical post 30. Vertical post 30 is concentrically mounted within swivel bearing 40 and post guide 45, the latter being connected to swivel bearing 40 by bolt means 50. The swivel bearing 40 and post guide 45 are rotatably mounted on support column 55 so as to allow the entire control mechanism and CRT to rotate freely about the support column 55.

Each portion of the mechanism, specifically the friction clamp 15, CRT case 10, joint bearing 20, bearing support 25, vertical post 30 and post guide 45 are either hollow or provided with a hollow portion to allow the passage of a flexible CRT ribbon connector 35 therethrough. Locating the connector at the rotation and inclination axes reduces to a minimum the motion imparted to the connector when the CRT is adjusted.

A vertical locking ring mechanism 75 is mounted within the swivel bearing 40 upon a vertical locking ring support pin 80 fixedly attached to post guide 45. The support pin 80 may alternatively be molded as an integral portion of the post guide 45. The post guide 45 is provided with a slot at 47 and is further provided with a stop tab 65 located at the bottom of the post guide. The stop tab 65 is provided so as to engage one of two stop brackets one of which is indicated at 70 in order to limit the rotational movement of the entire mounting assembly about the support column 55. The stop tab and stop brackets may alternatively be located on the post guide and support column as shown at 65A and 70A.

Figure 2:
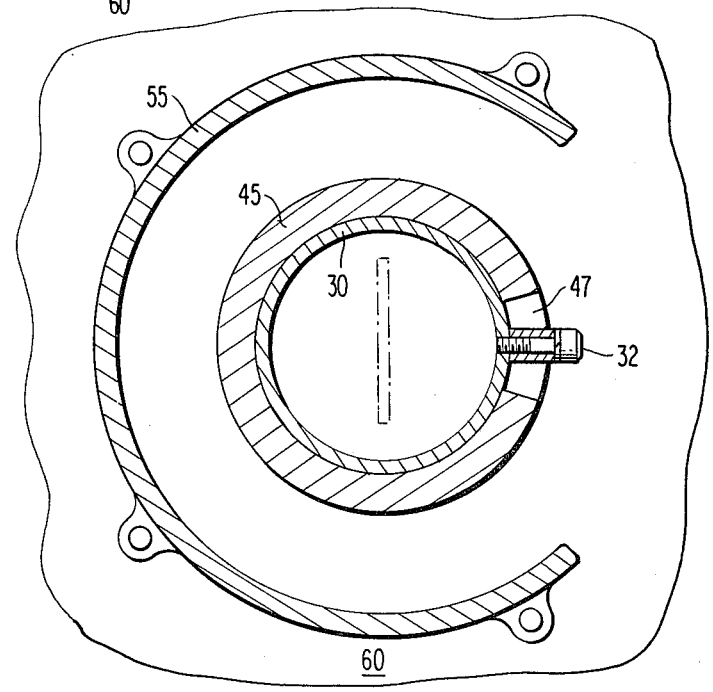
FIG. 2 illustrates the cross-sectional view taken at section A—A of FIG. 1.

FIG. 2 illustrates the cross-sectional view A—A of FIG. 1. As seen in FIG. 2, the support column 55 is fixedly attached to the base floor 60. Rotatably mounted within support column 55 are the concentric post guide 45 and vertical post 30. The swivel bearing 40 which is fixedly attached to post guide 45 meets with the support column 55 at a surfaced provided with a relatively low coefficient of friction so as to enable the swivel bearing to rotate freely with respect to the support column 55. The vertical post 30 and post guide 45, however, meet at surfaces which are provided with a slightly higher coefficient of friction so that a slightly larger force is required to produce rotation of the vertical post 30 within post guide 45 than the force required to rotate swivel bearing 40 about support column 55. Thus, stop pin 32 within slot 47 will only move relative to post guide 45 after stop tab 65 has engaged stop bracket 70 to prevent further rotation of the swivel bearing 40 with respect to support column 55.

Vertical adjustment of the vertical post 30 within the post guide 45 is provided by vertical locking ring 75 located within the swivel bearing 40. In order to raise the CRT, the CRT case is simply lifted vertically to effect a vertical motion of the locking ring 75 until the ring engages the uppermost portion of the interior of the swivel bearing 40. Upon reaching this upper limit, the locking ring 75 is fully concentric with the vertical post and freely allows upward vertical movement of the post with respect to the locking ring 75 and the post guide 45. Upon releasing the CRT case, the downward force of the CRT causes the vertical post to impart a downward force upon the locking ring 75. The locking ring is thereby vertically displaced in a downward direction as shown in the Figure and tightly engages the vertical post 30 to prevent further downward motion of the post.

A downward adjustment of the CRT is attained as follows. The CRT case is rotated in either direction until stop tab 65 engages stop bracket 70. At this point, further rotation of the CRT case 10 produces a rotation of the vertical post 30 within the post guide 45. This further rotation is limited by the stop pin 32 located on the vertical post 30 engaging the side of post guide 45 within the slot 47, as shown in FIG. 2.

Figure 5D:
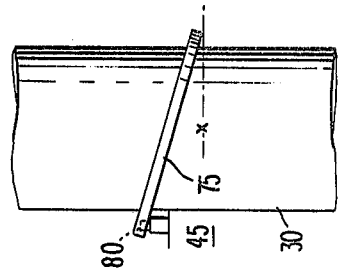
FIGS. 5b–5d are exaggerated illustrations of the movement of the vertical locking ring about the vertical post to effect a downward vertical motion of the vertical post.
Figure 5C:
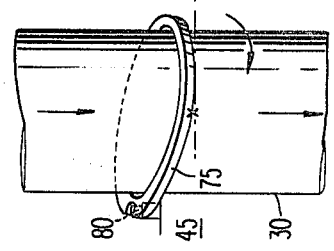
Figure 5B:
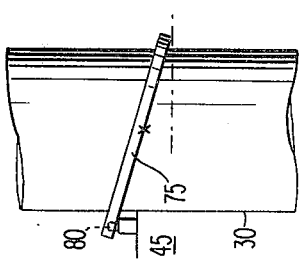
Figure 5A:
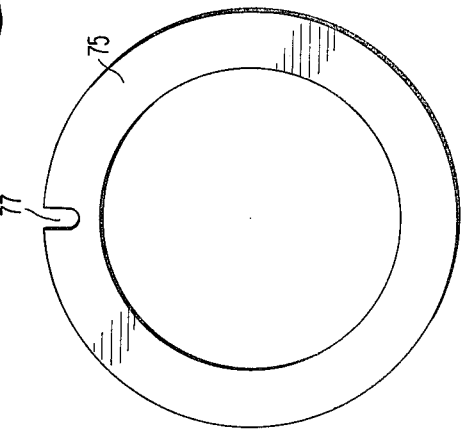
FIG. 5a is a drawing of the vertical locking ring.

With reference to FIGS. 5a and 5b, the locking ring 75 remains stationary with respect to the now stationary post guide 45 by means of attachment slot 77 which engages the locking ring support pin 80. The rotation of vertical post 30 within post guide 45 produces a rotation of the vertical post 30 within the locking ring 75 to thus produce a torque on the lock ring. This torque coupled with the constant downward force of the CRT upon the lock ring produces the motion illustrated in FIGS. 5b through 5d. FIG. 5b illustrates the position of the vertical post within the lock ring before any relative rotational motion occurs therebetween. Point X illustrated in FIG. 5b is shown as a vertical reference for the position of vertical post within the locking ring. Upon a rotation of the vertical post within the locking ring, the torque produced on the stationary locking ring coupled with the vertical downward force imparted on the locking ring produces a twisting or unseating of the locking ring from support pin 80 in the manner shown in FIG. 5c. The reference point X on the vertical post has been displaced downwardly by an amount determined by the downward twisting of the locking ring. Upon untwisting of the ring by releasing the rotational force from the CRT case, the lock ring reverts to its original configuration as shown in FIG. 5d. It can be seen, however, that the reference point in FIG. 5d has effected an overall downward displacement. Thus, repeated twisting of the CRT case with respect to the post guide will effect a downward screwing type action of the vertical post 30 within the post guide 45. Experiments have indicated that the inner surface of the lock ring, i.e., the surface in contact with the vertical post, should have a hardened knife-edge having a maximum radius of 0.01 inches, in order to produce the most effective downward motion. Both the inner surface of the lock ring and the surface of the vertical post can be comprised of hardened chrome, the micro-finish on the post being approximately 25–55 microinches for effective downward motion.

Figure 4:
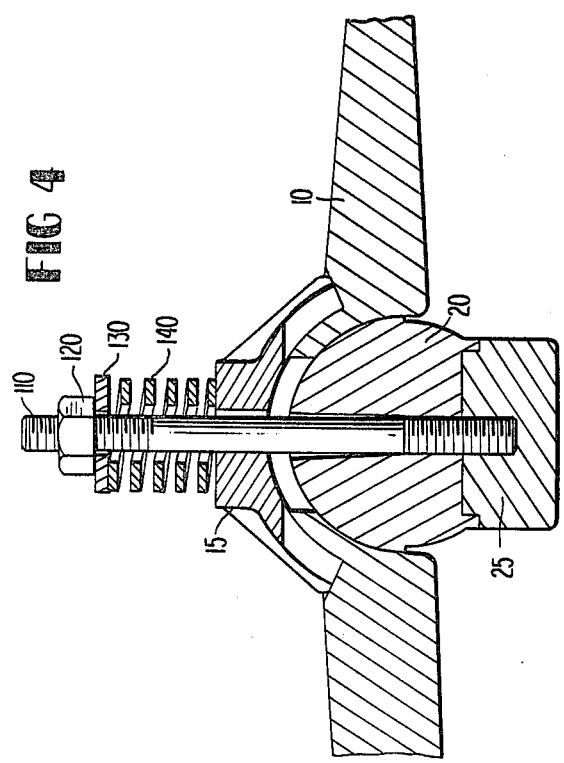
FIG. 4 illustrates a cross-sectional view of section C—C of FIG. 3.
Figure 3:
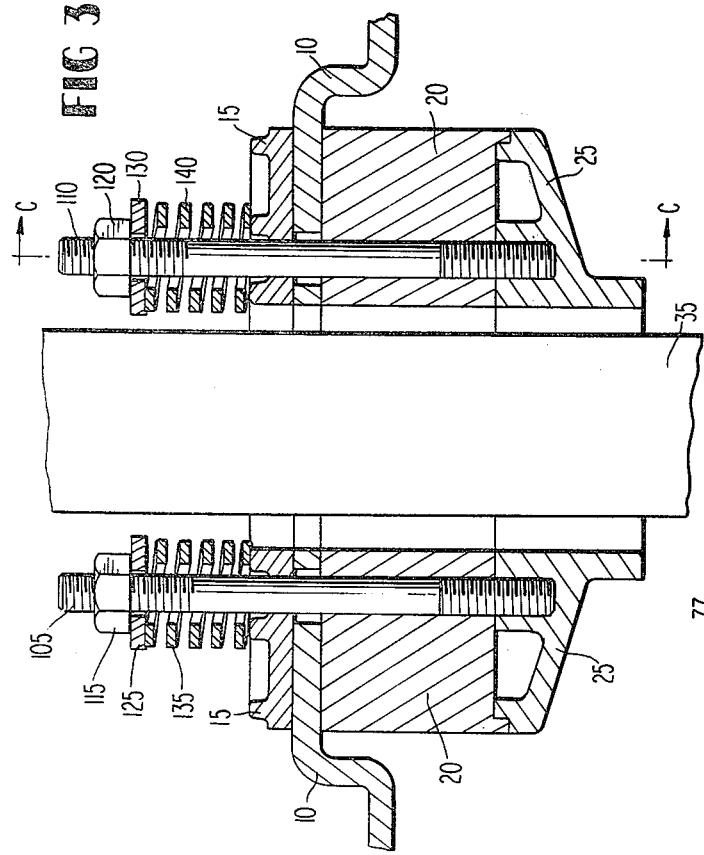
FIG. 3 illustrates a cross-sectional view taken at section B—B of FIG. 1.

The tilting mechanism will now be described with reference to FIGS. 1, 3 and 4. FIGS. 3 and 4 illustrate the cylindrical tilt joint bearing 20 which is fixedly mounted uon bearing support 25 by means of threaded bolts 105 and 110. The CRT case 10 is clamped to the tilt joint bearing 20 by means of the tilt friction clamp 15. The appropriate friction force between the joint 20, case 10 and clamp 15 is provided by the bolts 105 and 110 having friction springs 135 and 140, and adjust nuts 115 and 120, respectively. Washers 125 and 130 are provided between the nuts 115 and 120 and springs 135 and 140, respectively. The CRT case can thus be tilted back and forth relative to the tilt joint bearing 20 and clamp 15 so as accommodate the individual user's needs.

Thus, the present invention provides a mechanism for mounting a CRT or other display device and provides a conduit therethrough to allow an electrical cable to pass from the CRT through the mounting apparatus, and down to a stable point of connection. The mounting apparatus further provides freedom of motion of the CRT with respect to a floor base in three dimensions. That is, the CRT is capable of a ±15° tilt from the horizontal, ±60° rotation to either side of center, and a vertical height adjustment. These above-mentioned adjustments can be made without the aid of special tools or external operator controls.

Various changes, additions and omissions of elements may be made within the scope and spirit of this invention and it is to be understood that the invention is not limited to specific details, examples and preferred embodiments shown and described herein.

We claim:

1. A mechanical control apparatus for connecting an electrical apparatus mounted on an electrical apparatus structure to a stable base, comprising:
   a cylindrical bearing;
   a bearing clamp, said electrical apparatus structure located between said cylindrical bearing and said bearing clamp;
   a vertical post fixedly attached to said cylindrical bearing;
   a guide means for said vertical post surrounding said vertical post and defining a first friction coefficient between said guide means and said vertical post;
   a swivel bearing surrounding said vertical post and fixedly attached to said guide means;
   a vertical lock means surrounding said vertical post and connected to said guide means;
   a support structure having a surface upon which said swivel bearing rests to thereby define a second friction coefficient between said support structure and said swivel bearing, said second friction coefficient being less than said first friction coefficient, said support structure further being mounted on said stable base;
   wherein said bearing clamp, said electrical apparatus structure, said cylindrical bearing, said vertical post, said guide means and said support structure are provided with hollow portions to thereby provide a conduit from said electrical apparatus to said stable base; and
   cable means for connecting said electrical apparatus to external equipment, said cable means running through said conduit.

2. The apparatus of claim 1 wherein said guide means is provided with a stop tab and a slotted portion, said stable base is provided with at least one stop bracket, and said vertical post is provided with a stop pin disposed in said slotted portion of said guide means.

3. The apparatus of claim 2 wherein said swivel bearing and said guide means are adapted to provide a first rotation with respect to said support structure, said first rotation being limited by said stop tab engaging said stop bracket; and said vertical post means are adapted to provide a second rotation within said guide means, said second rotation being limited by said stop pin engaging said guide means.

4. The apparatus of claim 3 wherein said second rotation is effected only after said first rotation is limited.

5. The apparatus of claim 4 wherein said bearing clamp and said cylinder bearing are attached by a pair of bolt means, a bottom portion of each said bolt means being secured into said cylinder bearing, and an upper portion of each said bolt means extending through said electrical apparatus structure and said bearing clamp and provided with spring means located above said bearing clamp and a fastener located above said spring means.

6. The apparatus of claim 5 wherein said conduit is provided between said pair of bolt means.

7. The apparatus of claim 5 wherein said electrical apparatus is adapted for movement with respect to said bearing clamp and said cylinder bearing.

8. The apparatus of claim 7 wherein said movement is an inclination.

9. The apparatus of claim 4 wherein said vertical lock means is connected to said guide means by pin means fixedly attached to said guide means at a location intermediate said guide means and said swivel means, said pin means engaging said vertical lock means, whereby said vertical lock means provides (i) unrestricted upward movement and (ii) restricted downward movement of said vertical post with respect to said guide means.

10. The apparatus of claim 9 wherein said second rotation produces said restricted downward movement.

11. The apparatus of claim 9 wherein said second rotation causes said vertical lock means to be unseated from said pin means to thereby produce said restricted downward movement.

12. The apparatus of claim 1 wherein said vertical lock means has an inner surface having a hardened knife-edge and said vertical post has a hardened surface having a microfinish.

13. The apparatus of claim 12 wherein said knife edge has a maximum radius approximately 0.01 inches and is comprised of hardened chrome.

14. The apparatus of claim 13 wherein said vertical post is comprised of hardened chrome and has a microfinish of approximately 25–55 micro-inches.

* * * * *